(12) United States Patent
Bielecki et al.

(10) Patent No.: US 11,339,821 B2
(45) Date of Patent: May 24, 2022

(54) HIGH SECURITY FASTENER WITH EXTERNAL SHROUD RETAINER

(71) Applicant: McGard LLC, Orchard Park, NY (US)

(72) Inventors: Dustin D. Bielecki, Sloan, NY (US); Dillon Jones, Amherst, NY (US); Timothy Fox, Alden, NY (US); Daniel Tornow, Boston, NY (US); David C. Meyer, Boston, NY (US)

(73) Assignee: McGard LLC, Orchard Park, NY (US)

( * ) Notice: Subject to any disclaimer, the term of this patent is extended or adjusted under 35 U.S.C. 154(b) by 372 days.

(21) Appl. No.: 16/564,200

(22) Filed: Sep. 9, 2019

(65) Prior Publication Data

US 2020/0049189 A1     Feb. 13, 2020

Related U.S. Application Data

(62) Division of application No. 15/434,046, filed on Feb. 15, 2017, now Pat. No. 10,443,645.
(Continued)

(51) Int. Cl.
    *B21D 39/00*     (2006.01)
    *F16B 39/02*     (2006.01)
(Continued)

(52) U.S. Cl.
    CPC ............ *F16B 39/025* (2013.01); *B21D 39/00* (2013.01); *B21D 53/24* (2013.01);
(Continued)

(58) Field of Classification Search
    CPC ....... B21D 39/00; B21D 53/24; F16B 39/025; F16B 37/04; B23P 19/04; B29C 65/56
(Continued)

(56) References Cited

U.S. PATENT DOCUMENTS 787,578 A   *   4/1905   Lambert ................. F16B 37/14
                                                    29/520
1,042,831 A   *   10/1912   Stafford ................ F16B 5/0241
                                                    403/197
(Continued)

FOREIGN PATENT DOCUMENTS

| CN | 202073902 U | 12/2011 |
| GB | 1482510 A | 10/1977 |

(Continued)

OTHER PUBLICATIONS

The International Search Report (ISR) and Written Opinion of the International Searching Authority (ISA) for International Application No. PCT/US2017/018161; Publication No. WO 2017/143058 A1; dated Mar. 30, 2017.

*Primary Examiner* — Roberta S Delisle
(74) *Attorney, Agent, or Firm* — Harter Secrest & Emery LLP

(57) ABSTRACT

An improved fastener comprising a fastener body orientated about a central axis and having a tool-engaging portion, a threaded fastening portion and a shroud-receiving portion; a shroud concentrically mounted in the shroud-receiving portion to rotate relative to the fastener body under an applied external torque and having an outwardly extending annular shoulder; the shroud-receiving portion comprising an inwardly deformed stop radially overlapping the outwardly extending annular shoulder of the shroud; and the deformed stop of the shroud-receiving portion and the annular shoulder of the shroud forming a shroud-retaining element restraining the shroud from movement in at least a first axial direction along the central axis.

17 Claims, 7 Drawing Sheets

Related U.S. Application Data

(60) Provisional application No. 62/420,246, filed on Nov. 10, 2016, provisional application No. 62/295,983, filed on Feb. 16, 2016.

(51) Int. Cl.
  *B21D 53/24* (2006.01)
  *F16B 23/00* (2006.01)
  *F16B 37/14* (2006.01)
  *F16B 39/12* (2006.01)
  *F16B 39/28* (2006.01)
  *F16B 41/00* (2006.01)
  *B23P 19/12* (2006.01)
  *B21D 39/04* (2006.01)
  *B23P 11/00* (2006.01)

(52) U.S. Cl.
  CPC .......... *F16B 23/0007* (2013.01); *F16B 37/14* (2013.01); *F16B 39/02* (2013.01); *F16B 39/12* (2013.01); *F16B 39/28* (2013.01); *F16B 41/005* (2013.01); *B21D 39/046* (2013.01); *B23P 11/005* (2013.01); *B23P 19/12* (2013.01); *Y10T 29/4992* (2015.01); *Y10T 29/49936* (2015.01); *Y10T 29/49938* (2015.01); *Y10T 29/49948* (2015.01)

(58) Field of Classification Search
  USPC .................. 29/428, 525.01, 525.02, 525.03; 411/372.5, 372.6, 373
  See application file for complete search history.

(56) References Cited

U.S. PATENT DOCUMENTS

| | | | |
|---|---|---|---|
| 1,281,709 A | 10/1918 | Thomassen | |
| 1,459,548 A | 6/1923 | Morison | |
| 3,299,933 A | 1/1967 | Akashi | |
| 3,431,811 A | 3/1969 | Yonkers | |
| 3,696,646 A | 10/1972 | Loscalzo | |
| 3,955,231 A * | 5/1976 | Erdmann | B23K 11/04 411/429 |
| 4,295,766 A | 10/1981 | Shaw | |
| 4,302,137 A | 11/1981 | Hart | |
| 4,645,397 A | 2/1987 | Howe | |
| RE33,114 E | 11/1989 | Chiavon | |
| 5,228,250 A | 7/1993 | Kesselman | |
| 5,454,675 A | 10/1995 | Dehaitre | |
| 5,827,029 A | 10/1998 | Denman | |
| 6,540,460 B2 | 4/2003 | Miranda | |
| 6,641,343 B1 * | 11/2003 | Duran | F16B 41/005 411/910 |
| 6,935,825 B2 | 8/2005 | Winker | |
| 7,351,020 B1 | 4/2008 | Notaro | |
| 7,445,414 B1 | 11/2008 | Notaro et al. | |
| 8,333,537 B2 * | 12/2012 | Rogers | F16B 37/14 301/35.622 |
| 8,888,430 B2 | 11/2014 | Groppo | |
| 10,443,645 B2 * | 10/2019 | Bielecki | B21D 53/24 |
| 2003/0053886 A1 | 3/2003 | Ueno | |
| 2011/0116891 A1 | 5/2011 | Notaro et al. | |
| 2017/0234355 A1* | 8/2017 | Bielecki | F16B 39/28 411/429 |
| 2017/0234356 A1 | 8/2017 | Bielecki | |
| 2017/0234358 A1* | 8/2017 | Bielecki | F16B 39/28 411/429 |

FOREIGN PATENT DOCUMENTS

| | | |
|---|---|---|
| GB | 2179416 A | 3/1987 |
| GB | 2256821 A | 12/1992 |
| GB | 2374641 A | 10/2002 |
| GB | 2400061 A | 10/2004 |
| WO | 9702435 A1 | 7/1996 |
| WO | 0109527 A1 | 8/2001 |
| WO | 2004001237 A1 | 12/2003 |
| WO | 2015159034 A2 | 10/2015 |

* cited by examiner

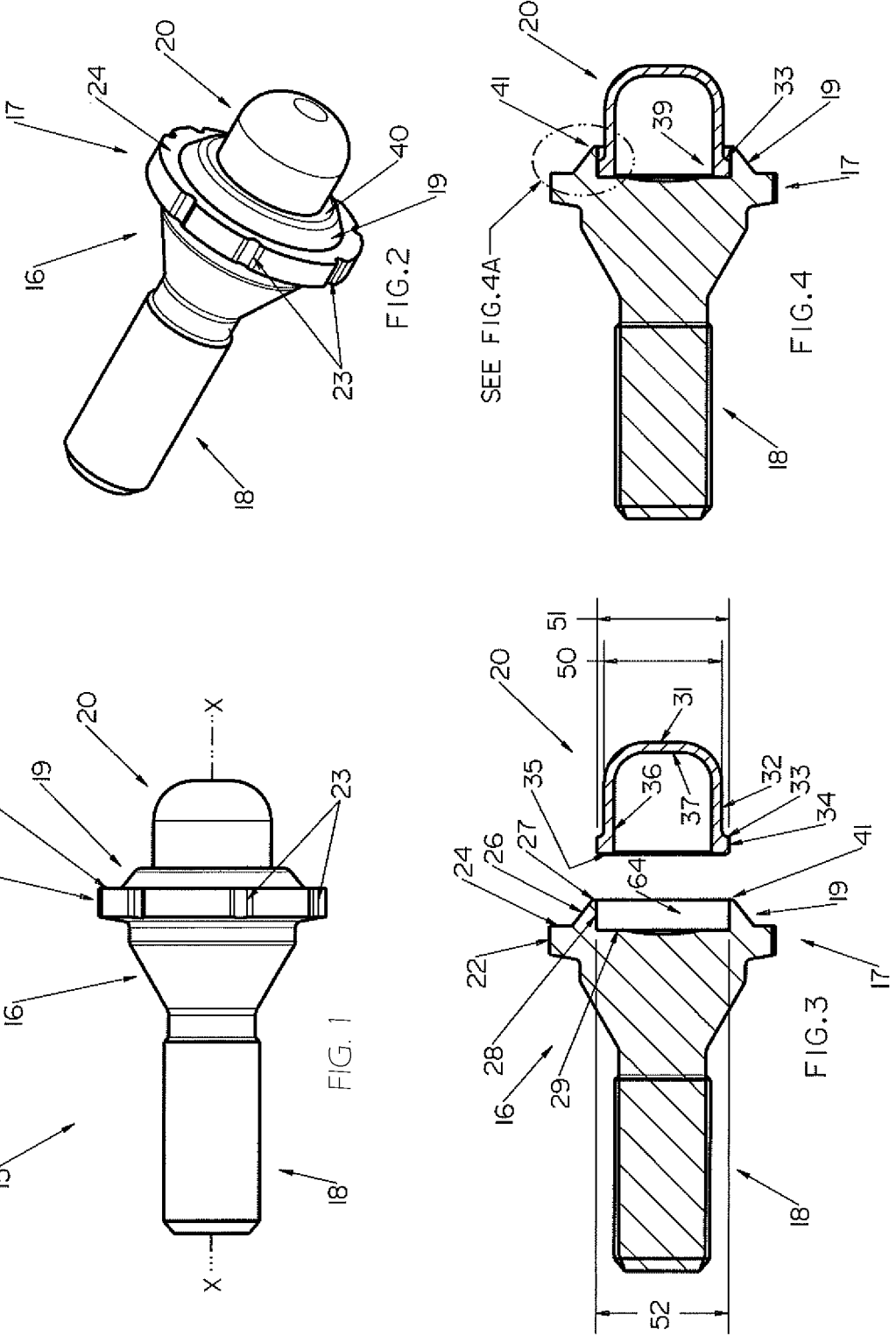

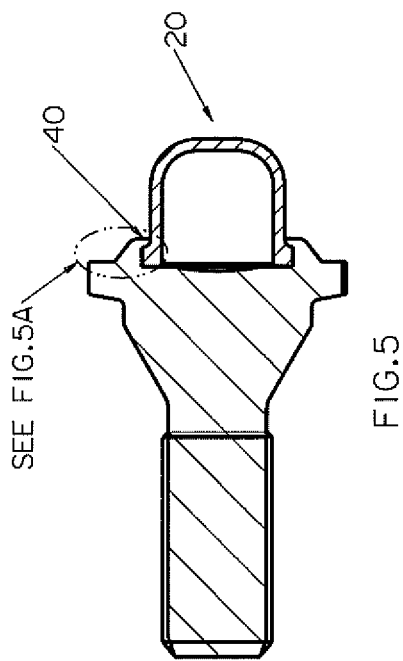
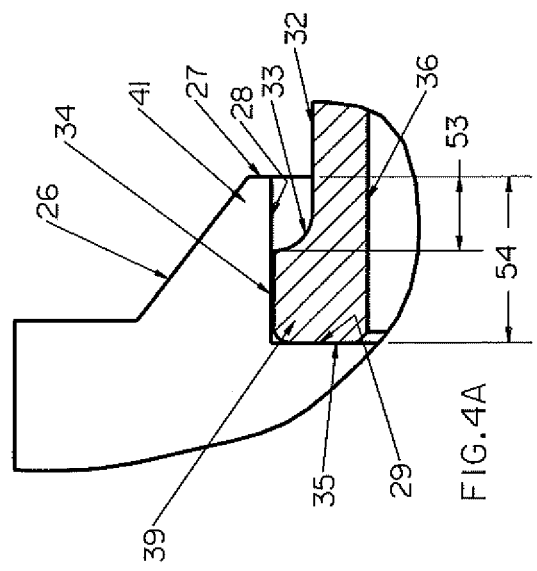
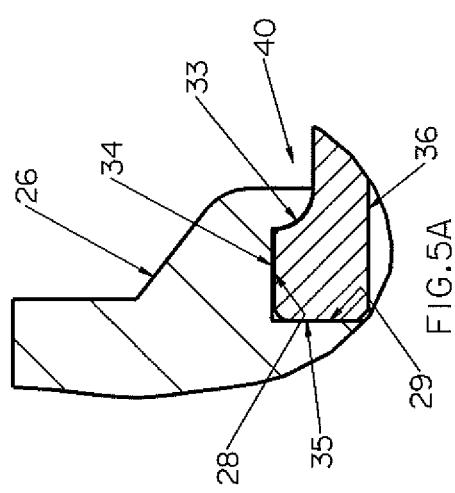

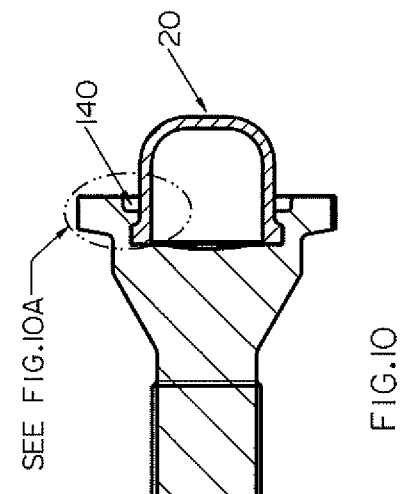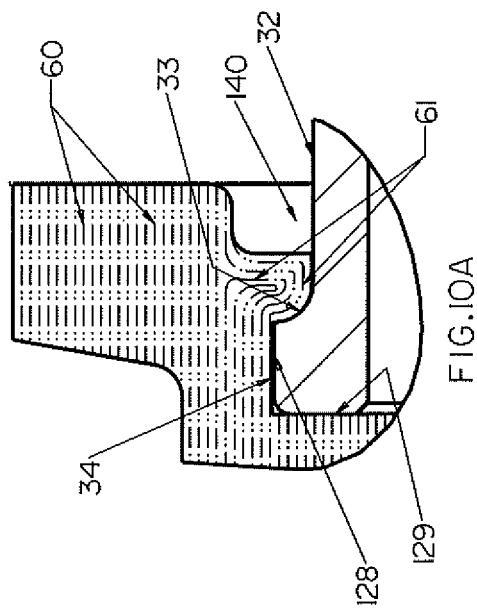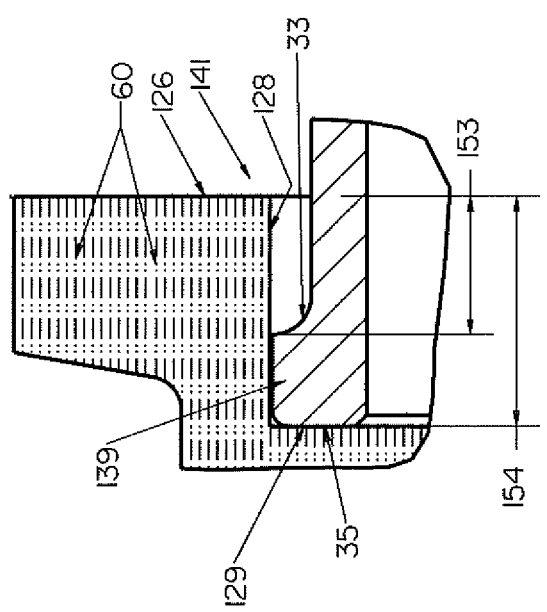

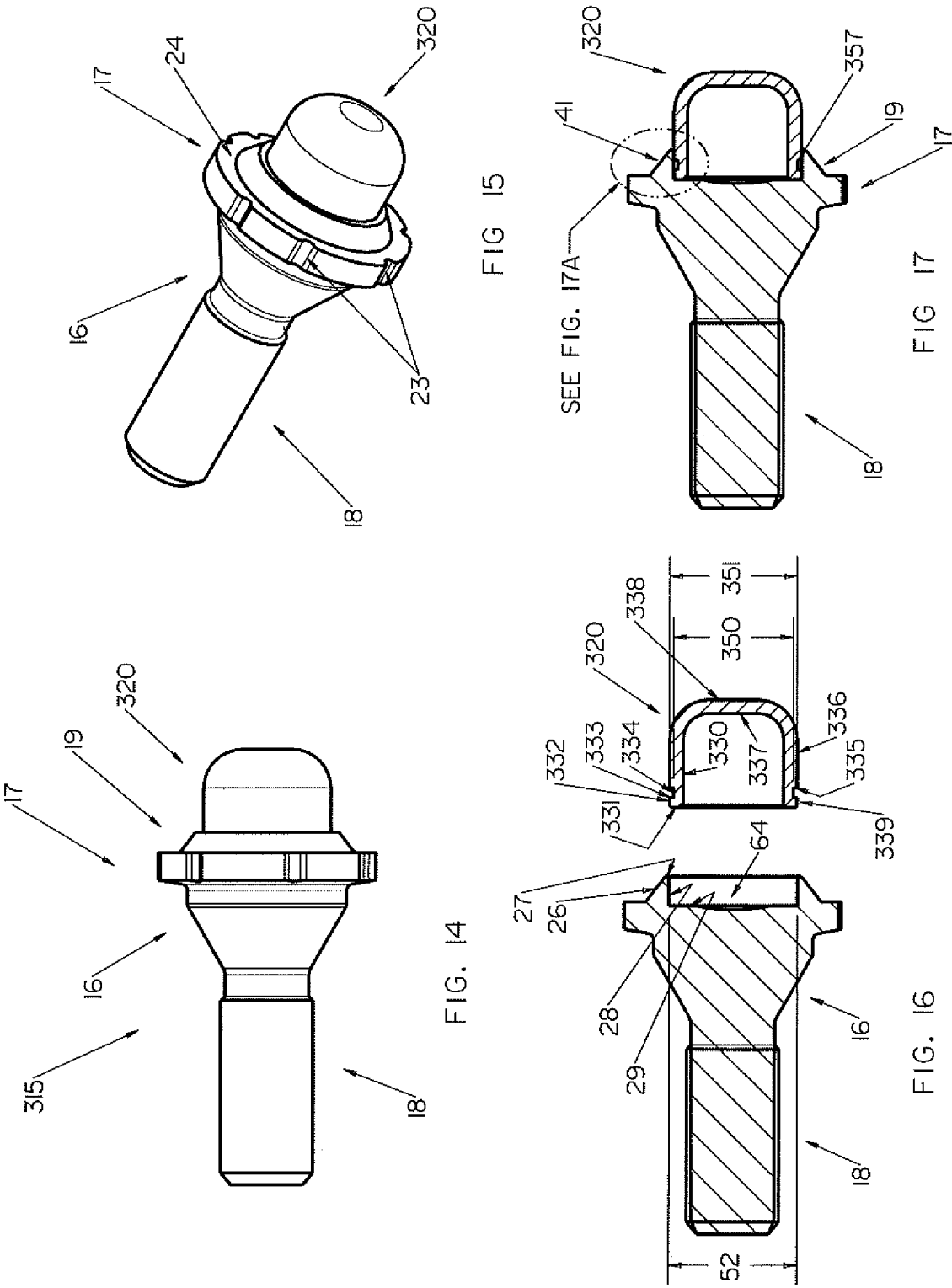

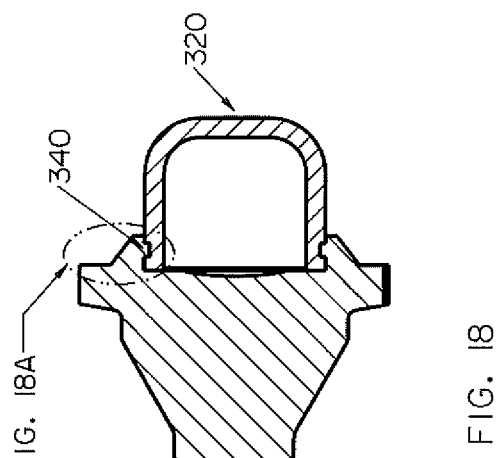
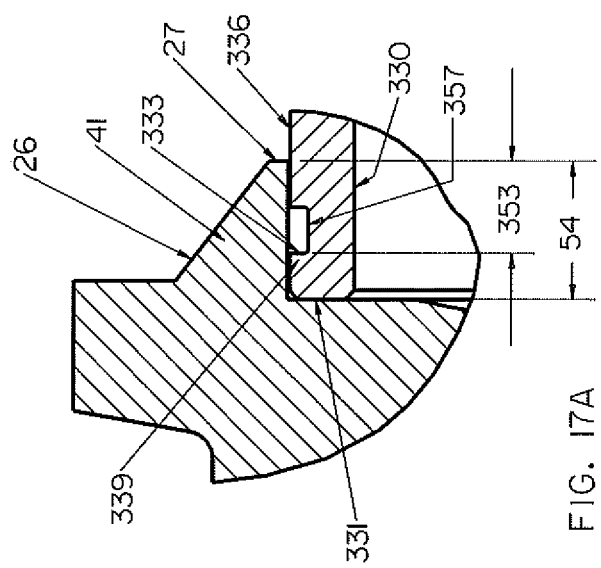
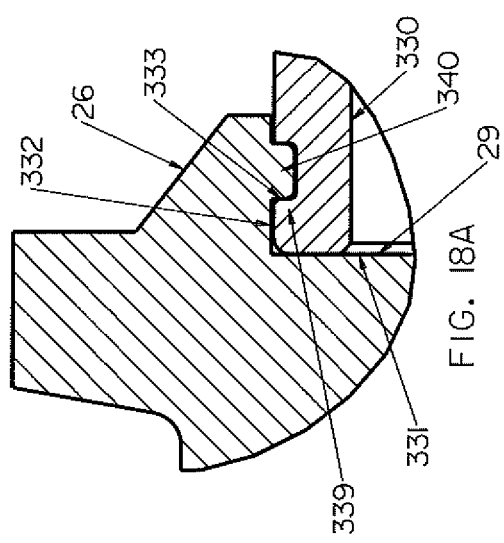

HIGH SECURITY FASTENER WITH EXTERNAL SHROUD RETAINER

TECHNICAL FIELD

The present invention relates to high security fasteners, and more particularly to a high security fastener having a shroud or cap retainer.

BACKGROUND ART

Locking wheel nuts and wheel bolts are commonly used to attach wheels to axel hub assemblies of automobiles and other vehicles. These fasteners are designed with security features that are intended to thwart theft by rendering the fasteners difficult to remove with conventional tools. In particular, the fasteners do not have the usual hexagonal head pattern found on conventional nuts and bolts and instead have smooth cylindrical sidewalls that cannot be gripped by standard wrenches. Fastener removal requires the use of a special security tool having a unique key pattern that matches a corresponding groove pattern formed in the fastener end face.

Additional security can be obtained by fitting a free-spinning shroud or cap over the security fasteners cylindrical sidewalls, such that the shroud is in concentric relationship therewith. The shroud discourages the use of theft devices that could otherwise be used to grip the sidewalls and remove the fastener without an authorized security tool. Because the shroud substantially surrounds all exposed surfaces of the sidewalls, no rotational purchase can be obtained in the fastener. The theft device can only engage the shroud, which freely spins under action of the theft device while the main body of the fastener remains stationary.

Various systems have been developed for rotationally retaining the shroud or spin cap on the fastener body. For example, U.S. Pat. No. 7,445,414, entitled "High Security Fastener Constructions," is directed to a shroud fastener design having a shroud retaining system for retaining the shroud for rotation relative to the fastener body. The entire contents and disclosure of U.S. Pat. No. 7,445,414 are incorporated herein by reference. International Patent Publication No. WO2004/001237, entitled "Screw-Threaded Fastening," is directed to a wheel nut having a fastener body and a spin cap or shroud which is retained on the fastener body by means of an outwardly flared end portion of the fastener body which is received within an undercut triangular groove in the inner surface of the cap.

BRIEF SUMMARY

With parenthetical reference to corresponding parts, portions or surfaces of the disclosed embodiment, merely for the purposes of illustration and not by way of limitation, an improved fastener (15, 115, 215, 315) is provided comprising a fastener body (16, 116, 216) orientated about a central axis (x-x); the fastener body having a tool-engaging portion (17) to which a driving torque may be applied and a threaded fastening portion (18) configured and arranged to mate with a corresponding threaded element; the fastener body having a shroud-receiving body portion (19, 119, 219) orientated about the central axis; a shroud (20, 320) concentrically mounted in the shroud-receiving body portion and having an outer surface (34, 332) facing an inner surface (28, 128) of the shroud-receiving body portion; the shroud being supported in rotatable relationship with the shroud-receiving body portion such that the shroud will rotate relative to the fastener body under an applied external torque prior to the fastener body rotating when the fastener is engaged with an external structure at a design installation torque; the shroud comprising an outwardly extending annular shoulder (33, 333); the shroud-receiving body portion comprising an inwardly deformed stop (40, 140, 240, 340) radially overlapping the outwardly extending annular shoulder of the shroud; and the deformed stop of the shroud-receiving body portion and the annular shoulder of the shroud forming a shroud-retaining element restraining the shroud from movement in at least a first axial direction along the central axis.

The shroud may comprise an annular shroud end surface (35, 331), the shroud-receiving body portion may comprise an annular body end surface (29, 129) facing the shroud end surface, and the annular shroud end surface and the annular body end surface may be in an opposing orientation and form a second shroud-retaining element restraining the shroud from movement in at least a second axial direction along the central axis opposite to the first axial direction along the central axis. The shroud-receiving body may comprise an annular end rim portion (41, 141, 241) extending axially beyond the annular shoulder and the deformed stop (40, 140, 240, 340) of the shroud-retaining element may be formed by a deformation of the rim portion of the shroud-receiving body radially inward. The rim may comprise a first cylindrical surface (28) parallel to the central axis and a second frusto-conical surface (26) extending away from the central axis at an acute angle relative to the first surface. The deformed stop of the shroud-retaining element may comprise multiple separate circumferentially arranged and spaced apart deformed stop elements (240). The deformed stop of the shroud-retaining element may comprise a continuous deformed annular ring (40, 140, 340).

The inner surface of the shroud-receiving body portion may comprises a cylindrical surface (28) having an inside diameter (52); the outer surface of the shroud may comprise a first cylindrical surface (34, 332) having a first outside diameter (51, 351) less than the inside diameter of the inner surface of the shroud-receiving body portion; the shroud may comprise a second cylindrical surface (32, 334) having a second outside diameter (50, 350) less than the first outside diameter; and the shroud may comprise an intermediate outer surface (33, 333) extending axially between the first cylindrical surface and the second cylindrical surface. The intermediate surface may comprise a frusto-conical surface or a concaved curved annular surface (33) defining the shoulder. The intermediate surface may comprise an annular surface orientated perpendicular to the central axis defining the shoulder. The second cylindrical surface having a second outside diameter less than said first outside diameter may comprise an inner surface (334) of an annular groove (357) formed in the first cylindrical surface (332/336) of the outer surface of the shroud and the intermediate surface may comprises an annular side surface (333) of the annular groove orientated perpendicular to the central axis and defining the shoulder.

The fastener body comprises a lock nut or a lock bolt. The fastener body may be formed of a first material and the shroud may be formed of a second material substantially softer than the first material. The fastener body may be formed of a first material and the shroud may be formed of a second material substantially more deformable than the first material. The fastener body (119) may comprise a cold formed grain flow (60) substantially parallel to the central axis and the deformed stop (140) of the shroud-receiving body portion may comprise an inwardly-curved U-shaped grain flow (61).

In another aspect, a method of forming a fastener is provided comprising the steps of providing a fastener body (16, 116) orientated about a central axis (x-x); the fastener body having a tool engaging portion (17) to which a driving torque may be applied, a threaded fastening portion (18) configured and arranged to mate with corresponding threaded element, and a shroud-receiving body portion (19, 119) orientated about the central axis; providing a shroud (20); mounting the shroud concentrically in the shroud-receiving body portion such that an outer surface (33, 34) of the shroud faces an inner surface (28, 128) of the shroud-receiving body portion; axially aligning an outwardly extending annular shoulder of the shroud with a deformable rim portion (41, 141) of the shroud receiving body; restraining the fastener body from moving in a first direction along the central axis; applying an axial force to the deformable rim portion of the shroud receiving body such that the deformable portion of the shroud receiving body deforms inwardly under the applied axial force to form an inwardly deformed stop (40, 140) radially overlapping the outwardly extending annular shoulder of the shroud; such that the shroud is restrained from movement in at least one axial direction along the central axis.

The shroud may comprise an annular shroud end surface, the shroud-receiving body portion may comprise an annular body end surface facing the shroud end surface, and the annular shroud end surface and the annular body end surface may be in an opposing orientation and form a second shroud-retaining element restraining the shroud from movement in at least a second axial direction along the central axis opposite to the first axial direction along the central axis. The deformable rim portion of the shroud receiving body may comprise an annular end rim portion extending axially beyond the annular shoulder. The deformable rim portion of the shroud receiving body may comprise a first cylindrical surface parallel to the central axis and a second frusto-conical surface extending away from the central axis at an acute angle relative to the first surface. The step of applying an axial force to the deformable rim portion of the shroud receiving body may comprise applying one or more axial forces to the deformable rim portion of the shroud receiving body at multiple separate circumferentially arranged and spaced apart locations on the deformable rim portion of the shroud receiving body. The deformed stop of the shroud-retaining element may comprise multiple separate circumferentially arranged and spaced apart deformed stop elements. The deformable rim portion of the shroud receiving body may comprise an annular ring and the step of applying an axial force to the deformable rim portion of the shroud receiving body may comprise applying the axial force uniformly around the annular rim. The deformed stop of the shroud-retaining element may comprise a continuous deformed annular ring. The inner surface of the shroud-receiving body portion may comprise a cylindrical surface having an inside diameter; the outer surface of the shroud may comprise a first cylindrical surface having a first outside diameter less than the inside diameter of the inner surface of the shroud-receiving body portion; the shroud may comprise a second cylindrical surface having a second outside diameter less than the first outside diameter; and the shroud may comprise an intermediate outer surface extending axially between the first cylindrical surface and the second cylindrical surface. The intermediate surface may comprise a frusto-conical surface or a concaved curved annular surface defining the shoulder. The intermediate surface may comprise an annular surface orientated perpendicular to the central axis defining the shoulder. The second cylindrical surface having a second outside diameter less than said first outside diameter may comprise an inner surface of an annular groove formed in the first cylindrical surface of the outer surface of the shroud and the intermediate surface may comprises an annular side surface of the annular groove orientated perpendicular to the central axis and defining the shoulder. The fastener body may comprise a lock nut or a lock bolt. The shroud-receiving body portion may be cold formed.

BRIEF DESCRIPTION OF THE DRAWINGS

FIG. 1 is a side elevation view of a first embodiment of an improved security fastener.

FIG. 2 is a perspective view of the security fastener shown in FIG. 1.

FIG. 3 is a pre-assembled exploded longitudinal vertical sectional view of the security fastener shown in FIG. 1.

FIG. 4 is a pre-assembled longitudinal vertical sectional view of the security fastener shown in FIG. 1.

FIG. 4A is an enlarged view of the security fastener shown in FIG. 4, taken generally within the indicated oval of FIG. 4.

FIG. 5 is a fully-assembled longitudinal vertical sectional view of the security fastener shown in FIG. 1.

FIG. 5A is an enlarged view of the security fastener shown in FIG. 5, taken generally within the indicated oval of FIG. 5.

FIG. 9A is an enlarged view of the security fastener shown in FIG. 9, taken generally within the indicated oval of FIG. 9, and showing the grain flow of the fastener body.

FIG. 10 is a fully-assembled longitudinal vertical sectional view of the security fastener shown in FIG. 6.

FIG. 10A is an enlarged view of the security fastener shown in FIG. 10, taken generally within the indicated oval of FIG. 10, and showing the grain flow of the fastener body.

FIG. 14 is a side elevation view of a fourth embodiment of an improved security fastener.

FIG. 15 is a perspective view of the security fastener shown in FIG. 14.

FIG. 16 is a pre-assembled exploded longitudinal vertical sectional view of the security fastener shown in FIG. 14.

FIG. 17 is a pre-assembled longitudinal vertical sectional view of the security fastener shown in FIG. 14.

FIG. 17A is an enlarged view of the security fastener shown in FIG. 17, taken generally within the indicated oval of FIG. 17.

FIG. 18 is a fully-assembled longitudinal vertical sectional view of the security fastener shown in FIG. 14.

FIG. 18A is an enlarged view of the security fastener shown in FIG. 18, taken generally within the indicated oval of FIG. 18.

DETAILED DESCRIPTION OF THE EMBODIMENTS

Figure 6:
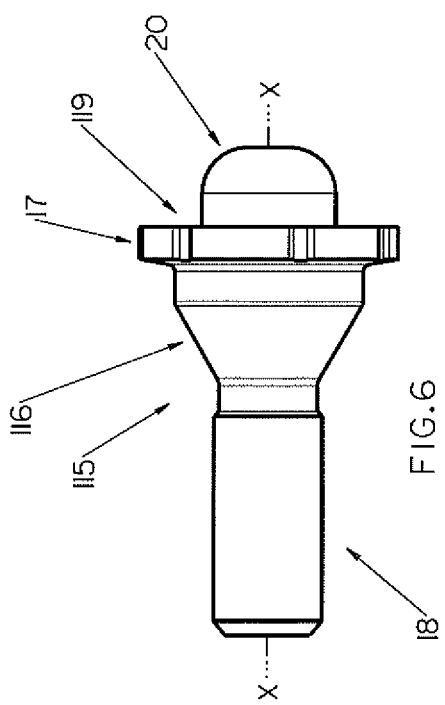
FIG. 6 is a side elevation view of a second embodiment of an improved security fastener.
Figure 7:
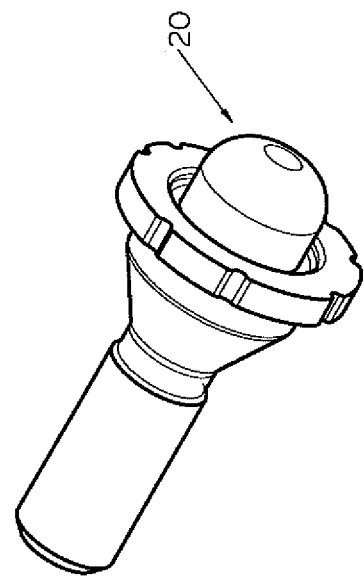
FIG. 7 is a perspective view of the security fastener shown in FIG. 6.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description of the embodiments. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to FIGS. 1-5A, an improved safety fastener is provided, a first bolt-type embodiment of which is generally indicated at 15. Bolt fastener 15 generally includes fastener body 16 and cap or shroud 20, which rotates about axis x-x relative to fastener body 16. Fastener body 16 includes tool engaging portion 17, threaded shank 18 and shroud-retaining portion 19 within which shroud 20 is rotationally supported. Bolt fastener 15 is installed in a wheel hole such that shroud retaining portion 19 and shroud 20 are arranged to be exposed outside the entrance of the hole. The fastening end portion 18 of bolt fastener 15 includes a shank that is externally threaded over a portion or all of its length. The bolt fastener is mounted on wheels that have at least one fastener-receiving recess hole with threads corresponding to the threads of shank 18.

Tool engaging portion 17 of fastener body 16 extends radially outward between fastening portion 18 and shroud-retaining portion 19 and comprises side wall 22 that is substantially cylindrical in shape. Side wall 22 is formed with a key-receiving pattern that may be implemented as a set of circumferentially arranged lock pattern grooves 23. Lock pattern configurations that use formations of other grooves may also be used. As can be seen, lock pattern grooves 23 are visible on the annular front face 24 of tool engaging portion 17 that lies between side wall 22 and shroud 20. In order to impart lock pattern uniqueness, lock pattern grooves 23 may be patterned or configured in any suitable alternative manner, such as by employing a selected number of grooves and/or by varying other features thereof, such as the spacing between grooves and/or the width, length, depth, profile or other configuration or feature thereof. Such grooves are configured so that a corresponding key (no shown) may be used to engage lock pattern grooves 23. The key includes a socket and a drive portion and the entrance to the socket is formed with a key pattern that may be implemented as a set of circumferentially arranged key pattern lobes that are configured and arranged to engage the lock pattern grooves 23 when the socket is placed over the right end of shroud 20 of nut fastener 15. Thus, a key having a matching set of key pattern lobes may be used to engage lock pattern grooves 23 to actuate bolt fastener 15 about axis x-x.

The security key is configured to fit within a gap space to engage the lock pattern and rotate bolt fastener 15. Other tools either will not fit within the gap space or will not be able to properly engage and rotate bolt fastener 15 when it is installed at its intended design installation torque. The size of the gap can be controlled by sizing the diameter of cylindrical sidewall 22 according to the diameter of the recess hole in which nut fastener 15 is employed. Tool engaging portion 17 is arranged so that sidewall 22 is within the wheel hole. In this position, the bolt fastener's lock pattern is only exposed inside the recessed wheel hole entrance and access to the bolt fastener's lock pattern is limited by the circumferential gap space between the lock pattern's outside diameter and the wheel hole's inside diameter. The ability of shroud 20 to spin relative to fastener body 16 and fastening portion 18 thereof provides a security feature that protects nut fastener 15 from being used as a purchase point for an unauthorized tools. Should an attempt be made to rotate bolt fastener 15 by gripping the exposed end, cap 20 will tend to spin without any rotation being imparted to fastener body 16 and fastening portion 18 thereof.

As shown in FIG. 3, shroud 20 has a generally cylindrical configuration elongated along axis x-x, and is generally bounded by leftwardly-facing vertical circular surface 37, inwardly-facing horizontal cylindrical surface 36, leftwardly-facing vertical annular surface 35, outwardly-facing horizontal cylindrical surface 34, rightwardly-facing concaved curved annular surface 33, outwardly-facing horizontal cylindrical surface 32, and rightwardly-facing vertical circular surface 31. The right portion of surface 34, surface 33 and the left portion of surface 32 generally form an outwardly extending annular shoulder 39 having first diameter 51 at surface 34 and having second diameter 50 at surface 32 that is less than diameter 51.

Pre-assembled, as shown in FIG. 3, retaining portion 19 of fastener body 16 is a specially configured cylindrical member elongated along axis x-x and is generally bounded by outwardly and rightwardly-facing frustoconical surface 26, rightwardly-facing vertical annular surface 27, inwardly-facing horizontal cylindrical surface 28, and rightwardly-facing vertical annular surface 29. As shown, retaining portion 19 thereby defines inner bore 64, having inside diameter 52 at surface 28, which is approximately the same size as outside diameter 51 of surface 34 of shroud 20. In addition, as shown in FIGS. 4 and 4A, the right inner portion of frustoconical surfaces 26, annular surface 27, and the right portion of surface 28 of retaining portion 19 generally define annular end rim portion 41.

In the pre-assembled state shown in FIGS. 4 and 4A, shoulder 39 of shroud 20 has been placed in inner bore 64 of retaining portion 19 of body 16 such that leftwardly-facing surface 35 of end shoulder 39 abuts against the outer portion of rightwardly-facing annular end face 29 of body 16. As shown, in this pre-assembled state, axial depth 54 of inner bore 64 of retaining portion 19 of body 16 is dimensioned to provide axial gap 53 between rightwardly-facing annular end face 27 of annular end rim portion 41 of retaining portion 19 and the left outside edge of surface 33 of end shoulder 39 of shroud 20. When assembled as described below, axial gap 53 will be reduced as annular end rim portion 41 of retaining portion 19 deforms inward against shroud 20 and reduces the axial length along axis x-x of annular end rim portion 41 of retaining portion 19.

To complete assembly of fastener 15, with end shoulder 39 of shroud 20 placed within bore 64 of retaining portion 19 of body 16 such that leftwardly-facing annular surface 35 of end shoulder 39 of shroud 20 abuts against the outer annular portion of end face 29 of body 16, as shown in FIGS. 4 and 4A, an axial force is then applied with a ram to rightwardly-facing surface 27 of annular end rim portion 41 of retaining portion 19 while fastener body 16 is held stationary in a press or the like. Such force is great enough to deform or bend annular end rim portion 41 of retaining portion 19 and the right portion of surface 28 of retaining portion 19 leftward and inward against opposed surfaces 33 and 32 of shroud 20 to form end stop 40, as shown in FIGS. 5 and 5A, which depict the fully assembled configuration of fastener 15. Thus, fastener body 16 and shroud 20 are specially formed such that applying a directed axial force to retaining portion 19 with a ram causes annular end rim portion 41 of retaining portion 19 to flare or deform inwards into specially formed shoulder 33 of shroud 20.

When assembled, at least deformed portion 40 of annular end rim portion 41 of retaining portion 19 radially overlaps shoulder 33 of shroud 20, thereby retaining shroud 20 within the end of body 16 such that shroud 20 is free to rotate about center axis x-x of body 16 but is restrained from moving axially to the right out of retaining portion 19 and body 16. Thus, as shown in FIGS. 5 and 5A, continuous deformed annular ring stop 40 is formed, which extends inwardly transverse to central axis x-x and has at least a portion that overlaps radially with surface 33 of end shoulder 39 of shroud 20. Opposed surface 29 of retaining portion 19 of body 16 and surface 35 of shroud 20, retain shroud 20 such that shroud 20 is free to rotate about center axis x-x of body 16 but is restrained from moving axially to the left.

Shroud 20 is thereby mounted concentrically in retaining portion 19 of bolt fastener 15 such that it does not move axially out of retaining portion 19 but is substantially free to rotate about axis x-x relative to fastener body 16. Although exterior surfaces 34 and 32 of shroud 20 are shown as being substantially cylindrical, and surface 33 is shown as being substantially concaved and sloped, other cross-sectional profiles, shapes, or contours could be used to form a retaining shoulder or protrusion. For example, and without limitation, surface 33 could be a rightwardly-facing vertical annular surface or an outwardly and rightwardly-facing frustoconical surface, or other alternative stepped or rightwardly-facing contoured surfaces. Moreover, although shroud 20 is shown as being closed-ended on one side, alternatively it may have an open-ended configuration. If desired, shroud 20 may comprise a cap have a decorative finish to improve fastener appearance, including, but not limited to, nickel/chrome plating, silver or gray coatings. Furthermore, and without limitation, shroud 20 may be a decorative cap that is made of a material that is substantially softer or more malleable that the material of retaining portion 19. Without limitation, such cap may be plastic, rubber or ceramic or may have a coating that is plastic, rubber, ceramic, anodized or organic. In addition, shroud 20 may be stainless steel, fastener body 16 may not be stainless steel, and an isolation element or layer may be placed between the contacting surfaces of shroud 20 and fastener body 16.

While forming stop 41 by applying a single axial force with a ram to exposed end rim portion 41 of retaining portion 19 while fastener body 16 is held stationary in a press has been described, more than a single axial ramming force may be applied or such force may be applied at an angle relative to axis x-x.

The described retaining system provides a number of advantages. First, a greater variety of cap or shroud materials and cap or shroud designs may be used because no force is applied to the cap or shroud to form restraining element 41. Restraining element 41 is formed from the material of fastener body 16, rather than cap or shroud 20, and an axial ramming force is applied to fastener body 16, rather than cap or shroud 20. Second, the materials of fastener body 16 and shroud 20 may differ significantly in hardness. For example and without limitation, fastener body 16 may have a greater hardness than shroud 20 or fastener body 16 may be of a material more elastic than shroud 20. As described further below, fastener body 16 may be cold formable such that it may not need to be machined. In this manner, the grain flow of a cold formed fastener body 16 may be parallel to the longitudinal axis x-x of the fastener.

Referring now to FIGS. 6-10A, a bolt-type security fastener 115 according to a second example embodiment is shown. Fastener 115 has most of the features of fastener 15 described above in connection with FIGS. 1-5A. Tool engaging portion 17, threaded shank 18 and shroud 20 of fastener 115 are of the same configuration as tool engaging portion 17, threaded shank 18 and shroud 20 of fastener 15. The major difference between fastener 15 and fastener 115 lies in the fact that annular end rim portion 141 of retaining portion 119 of fastener 115 is of a squared configuration as compared to tapered annular end rim portion 41 of retaining portion 19 of fastener 15.

Figure 8:
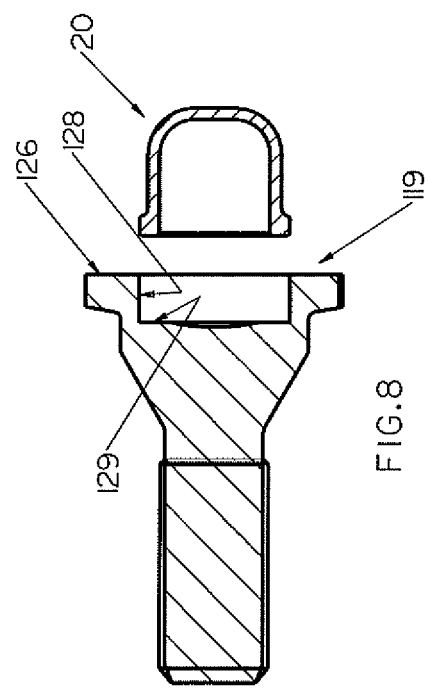
FIG. 8 is a pre-assembled exploded longitudinal vertical sectional view of the security fastener shown in FIG. 6.
Figure 9:
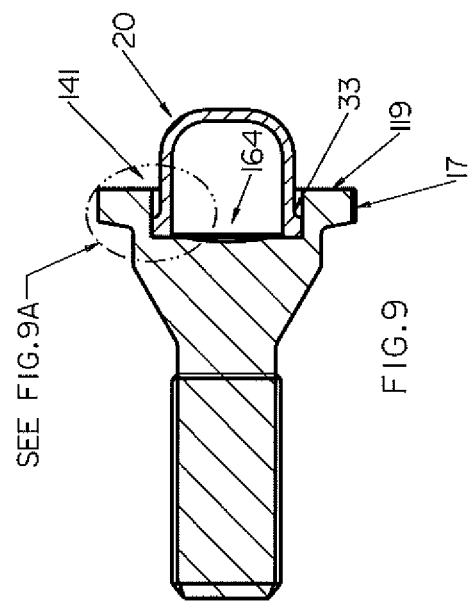
FIG. 9 is a pre-assembled longitudinal vertical sectional view of the security fastener shown in FIG. 6.

As shown in FIG. 8, retaining portion 119 of fastener body 116 is a specially configured cylindrical member elongated along axis x-x and is generally bounded by rightwardly-facing vertical annular surface 126, inwardly-facing horizontal cylindrical surface 128, and rightwardly-facing vertical annular surface 129. As shown in FIGS. 9 and 9A, the inner portion of annular surface 126 and the right portion of surface 128 of retaining portion 119 generally define annular end rim portion 141.

In the pre-assembled state shown in FIG. 9, shroud 20 has been placed in inner bore 164 of retaining portion 119 of body 116 such that leftwardly-facing surface 35 abuts against the outer portion of rightwardly-facing annular end face 129 of body 116. As shown, in this pre-assembled state, axial depth 154 of inner bore 164 of retaining portion 119 of body 116 is dimensioned to provide axial gap 153 between rightwardly-facing annular surface 126 of annular end rim portion 141 of retaining portion 119 and the left outside edge of surface 33 of shroud 20.

To complete assembly of fastener 115, with shoulder 139 of shroud 20 placed within bore 164 of retaining portion 119 of body 116 such that leftwardly-facing annular surface 35 of shoulder 139 of shroud 20 abuts against the outer annular portion of end face 129 of body 116, as shown in FIGS. 9 and 9A, an axial force is then applied with a ram to the inner portion of rightwardly-facing surface 126 of annular end rim portion 141 of retaining portion 119 while fastener body 116 is held stationary in a press or the like. Such force is great enough to deform or bend annular end rim portion 141 of retaining portion 119 and the inner portion of surface 126 of retaining portion 119 inward and leftward against opposed surfaces 33 and 32 of shroud 20 to form end stop 140, as shown in FIGS. 10 and 10A, which depict the fully assembled configuration of fastener 115. Thus, fastener body 116 and shroud 20 are specially formed such that applying a directed axial force to retaining portion 119 with a ram causes annular end rim portion 141 of retaining portion 119 to flare or deform inwards into specially formed shoulder 33 of shroud 20.

When assembled, at least deformed portion 140 of annular end rim portion 141 of retaining portion 119 radially overlaps shoulder 33 of shroud 20, thereby retaining shroud 20 within the end of body 116 such that shroud 20 is free to rotate about center axis x-x of body 116 but is restrained from moving axially to the right out of retaining portion 119 and body 116. Thus, as shown in FIG. 10, continuous deformed annular ring stop 140 is formed, which extends inwardly transverse to central axis x-x and has at least a portion that overlaps radially with surface 33 of end shoulder 139 of shroud 20. Opposed surface 129 of retaining portion 119 of body 116 and surface 35 of shroud 20, retain shroud 20 such that shroud 20 is free to rotate about center axis x-x of body 116 but is restrained from moving axially to the left.

As shown in FIGS. 9A and 10A, in this embodiment fastener body 116 is cold formed with a grain flow parallel to the longitudinal axis x-x of fastener 115. Thus, in the preassembled state shown in FIG. 9A, the grain flow of end rim portion 141 of retaining portion 119 is longitudinal or substantially parallel to axis x-x. When the axial force is applied with a ram to the inner portion of rightwardly-facing surface 126 of annular end rim portion 141 of retaining portion 119 while fastener body 116 is held stationary in a press or the like, such force is great enough to deform or bend annular end rim portion 141 of retaining portion 119 such that grain flow 61 of resulting deformed stop 140 is inwardly-curved U-shaped.

Figure 12:
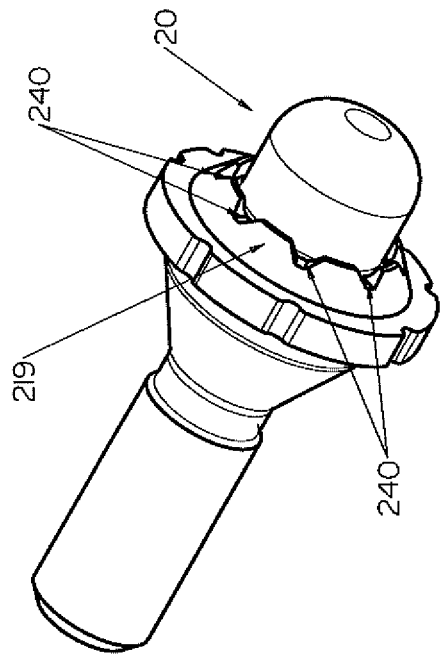
FIG. 12 is a perspective view of the security fastener shown in FIG. 11.
Figure 11:
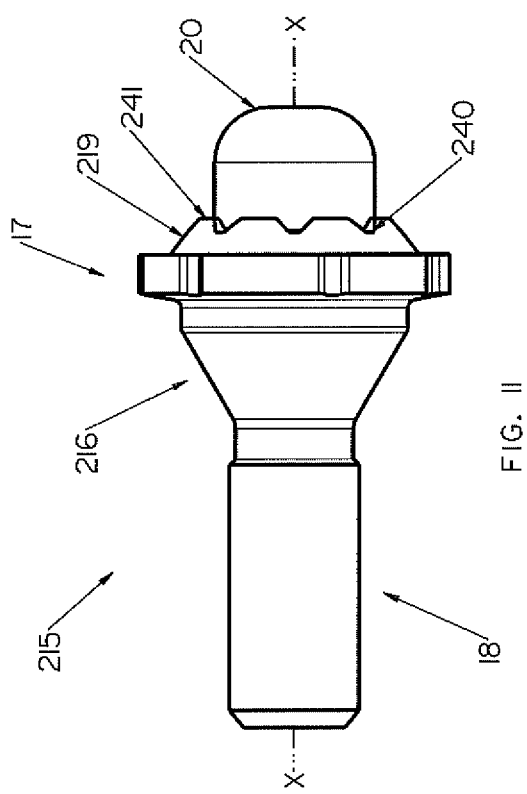
FIG. 11 is a side elevation view of a third embodiment of an improved security fastener.
Figure 13:
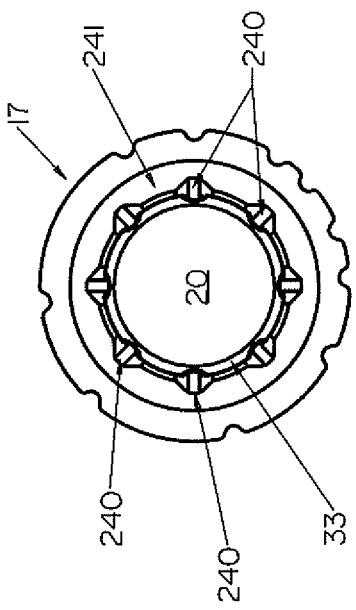
FIG. 13 is a right side elevation view of the security fastener shown in FIG. 11.

Referring now to FIGS. 11-13, a bolt-type security fastener 215 according to a third example embodiment is shown. Fastener 215 has most of the features of fastener 15 described above in connection with FIGS. 1-5A. Tool engaging portion 17, threaded shank 18 and shroud 20 of fastener 115 are of the same configuration as tool engaging portion 17, threaded shank 18 and shroud 20 of fastener 15. The major difference between fastener 15 and fastener 215 lies in the fact that deformed stop 240 of shroud-retaining element 219 comprises multiple separate circumferentially arranged and spaced apart deformed stop elements, severally indicated at 240.

As shown in FIGS. 11-13, retaining portion 219 of fastener body 216 is of the same configuration as retaining portion 19 of fastener body 16 of fastener 15. However, to complete assembly of fastener 215, with the shoulder of shroud 20 placed within the bore of retaining portion 219 of body 216, rather than applying a uniform annular axial force to annular rim portion 241 of fastener body 216, such axial force is applied at eight circumferentially spaced points about annular rim portion 241 of fastener body 216 with a specially configured ram while fastener body 216 is held stationary in a press or the like. Such force is great enough to deform or bend circumferentially spaced portions of annular end rim portion 241 of retaining portion 219 inward and leftward against opposed surfaces 33 and 32 of shroud 20 to form multiple circumferentially spaced end stops 240, as shown in FIG. 13, which depicts the fully assembled configuration of fastener 215. Thus, applying such pointed circumferentially spaced directed axial forces to retaining portion 219 with a specially configured ram causes only circumferentially spaced portions 240 of annular end rim portion 241 of retaining portion 219 to flare or deform inwards into shoulder 33 of shroud 20, providing a staked inwardly deformed stop 240 radially overlapping the outwardly extending annular shoulder of the shroud. While eight such staked deformed portions 240 are shown and described in this embodiment, it is contemplated that more or fewer than eight circumferentially spaced deformed portions may be employed and that the spacing between such deformed portions about the annular rim may be varied as desired. For example, and without limitation, three deformed portions spaced equally about the annular rim might be provided.

When assembled, at least deformed portions 240 of annular end rim portion 241 of retaining portion 219 radially overlap shoulder 33 of shroud 20, thereby retaining shroud 20 within the end of body 216 such that shroud 20 is free to rotate about center axis x-x of body 216 but is restrained from moving axially to the right out of retaining portion 219 and body 216. Thus, as shown in FIG. 13, a plurality of annularly spaced deformed stops 240 are formed, each of which extends inwardly transverse to central axis x-x and has at least a portion that overlaps radially with surface 33 of end shoulder 39 of shroud 20.

Referring now to FIGS. 14-18A, a bolt-type security fastener 315 according to a fourth example embodiment is shown. Fastener 315 has most of the features of fastener 15 described above in connection with FIGS. 1-5A. Tool engaging portion 17, threaded shank 18 and shroud-retaining portion 19 of fastener 315 are of the same configuration as tool engaging portion 17, threaded shank 18 and shroud-retaining portion 19 of fastener 15. The major difference between fastener 15 and fastener 315 lies in the fact that shoulder 333 of shroud 320 is formed by a groove in the outwardly-facing cylindrical surface of shroud 320.

As shown in FIG. 18A, shroud 320 has a generally cylindrical configuration elongated along axis x-x, and is generally bounded by leftwardly-facing vertical circular surface 337, inwardly-facing horizontal cylindrical surface 330, leftwardly-facing vertical annular surface 331, outwardly-facing horizontal cylindrical surface 332, rightwardly-facing vertical annular surface 333, outwardly-facing horizontal cylindrical surface 334, leftwardly-facing vertical annular surface 335, outwardly-facing horizontal cylindrical surface 336, and rightwardly-facing vertical circular surface 338. The right portion of surface 332, surface 333 and surface 334 form an outwardly extending annular shoulder 339 having first diameter 351 at surface 332 and having second diameter 350 at surface 334, which is the base of groove 357 defined by surfaces 333, 334 and 335, that is less than diameter 351.

In the pre-assembled state shown in FIG. 17, shroud 20 has been placed in inner bore 64 of retaining portion 19 of body 16 such that leftwardly-facing surface 331 abuts against the outer portion of rightwardly-facing annular end face 29 of body 16. As shown, in this pre-assembled state, axial depth 54 of inner bore 64 of retaining portion 19 of body 16 is dimensioned to provide axial gap 353 between rightwardly-facing annular surface 27 of annular end rim portion 41 of retaining portion 19 and surface 333 of groove 357 of shroud 20.

To complete assembly of fastener 315, with shoulder 339 of groove 357 of shroud 320 placed within bore 64 of retaining portion 19 of body 16 such that leftwardly-facing annular surface 331 of shroud 320 abuts against the outer annular portion of end face 29 of body 16, as shown in FIGS. 17 and 17A, an axial force is then applied with a ram to rightwardly-facing surface 27 of annular end rim portion 41 of retaining portion 19 while fastener body 16 is held stationary in a press or the like. Such force is great enough to deform end rim portion 41 of retaining portion 19 and inner surface 28 of retaining portion 19 inward against opposed surfaces 333 and 334 of groove 357 of shroud 320 to form end stop 340, as shown in FIGS. 18 and 18A, which depict the fully assembled configuration of fastener 315. Thus, fastener body 16 and shroud 320 are specially formed such that applying a directed axial force to retaining portion 19 with a ram causes annular end rim portion 41 of retaining portion 19 to flare or deform inwards into groove 357 and shoulder 333 of shroud 320.

When assembled, at least deformed portion 340 of annular end rim portion 41 of retaining portion 19 radially overlaps shoulder 333 of shroud 320, thereby retaining shroud 320 within the end of body 16 such that shroud 320 is free to rotate about center axis x-x of body 16 but is restrained from moving axially to the right out of retaining portion 19 and body 16. In this embodiment, due to the structure of groove 357 and leftwardly-facing annular surface 335 opposite surface 333, deformed portion 340 also restrains shroud 320 from moving axially to the left. Thus, as shown in FIG. 18, continuous deformed annular ring stop 340 is formed in groove 357, which extends inwardly transverse to central axis x-x and has at least a portion that overlaps radially with surface 333 of end shoulder 339 of shroud 320.

The present disclosure contemplates that many changes and modifications may be made. Therefore, while forms of the improved fastener have been shown and described, and a number of alternatives discussed, persons skilled in this art will readily appreciate that various additional changes and modifications may be made without departing from the scope of the invention, as defined and differentiated by the following claims.

What is claimed is:

1. A method of forming a fastener comprising the steps of:
providing a fastener body orientated about a central axis;
said fastener body having a tool engaging portion to which a driving torque may be applied, a threaded fastening portion configured and arranged to mate with corresponding threaded element, and a shroud-receiving body portion orientated about said central axis;
providing a shroud;
mounting said shroud concentrically in said shroud-receiving body portion such that an outer surface of said shroud faces an inner surface of said shroud-receiving body portion;
axially aligning an outwardly extending annular shoulder of said shroud with a deformable rim portion of said shroud receiving body portion;
restraining said fastener body from moving in a first direction along said central axis;
applying an axial force to said deformable rim portion of said shroud receiving body portion such that said deformable rim portion of said shroud receiving body portion deforms inwardly under said applied axial force to form an inwardly deformed stop radially overlapping said outwardly extending annular shoulder of said shroud; and
such that said shroud is restrained from movement in at least one axial direction along said central axis; and
such that said shroud is permitted to rotate about said central axis relative to said fastener body under an applied external torque prior to said fastener body rotating when said fastener body is engaged with an external structure at a design installation torque.

2. The method set forth in claim 1, wherein said shroud comprises an annular shroud end surface, said shroud-receiving body portion comprises an annular body end surface facing said shroud end surface, and said annular shroud end surface and said annular body end surface are in an opposing orientation and form a second shroud-retaining element restraining said shroud from movement in at least a second axial direction along said central axis opposite to said first axial direction along said central axis.

3. The method set forth in claim 1, wherein said deformable rim portion of said shroud receiving body portion comprises an annular end rim portion extending axially beyond said annular shoulder.

4. The method set forth in claim 1, wherein said deformable rim portion of said shroud receiving body portion comprises a first cylindrical surface parallel to said central axis and a second frusto-conical surface extending away from said central axis at an acute angle relative to said first surface.

5. The method set forth in claim 1, wherein said step of applying an axial force to said deformable rim portion of said shroud receiving body portion comprises applying one or more axial forces to said deformable rim portion of said shroud receiving body portion at multiple separate circumferentially arranged and spaced apart locations on said deformable rim portion of said shroud receiving body portion.

6. The method set forth in claim 5, wherein said deformed stop of said shroud-retaining element comprises multiple separate circumferentially arranged and spaced apart deformed stop elements.

7. The method set forth in claim 1, wherein said deformable rim portion of said shroud receiving body portion comprises an annular ring and said step of applying an axial force to said deformable rim portion of said shroud receiving body portion comprises applying said axial force uniformly around said annular rim.

8. The method set forth in claim 7, wherein said deformed stop of said shroud-retaining element comprises a continuous deformed annular ring.

9. The method set forth in claim 1, wherein:
said inner surface of said shroud-receiving body portion comprises a cylindrical surface having an inside diameter;
said outer surface of said shroud comprises a first cylindrical surface having a first outside diameter less than said inside diameter of said inner surface of said shroud-receiving body portion;
said shroud comprises a second cylindrical surface having a second outside diameter less than said first outside diameter; and
said shroud comprises an intermediate outer surface extending axially between said first cylindrical surface and said second cylindrical surface.

10. The method set forth in claim 9, wherein said intermediate surface comprises a frusto-conical surface or a concaved curved annular surface defining said shoulder.

11. The method set forth in claim 9, wherein said intermediate surface comprises an annular surface orientated perpendicular to said central axis defining said shoulder.

12. The method set forth in claim 9, wherein said second cylindrical surface having a second outside diameter less than said first outside diameter comprises an inner surface of an annular groove formed in said first cylindrical surface of said outer surface of said shroud and said intermediate surface comprises an annular side surface of said annular groove orientated perpendicular to said central axis and defining said shoulder.

13. The method set forth in claim 1, wherein said fastener body comprises a lock nut or a lock bolt.

14. The method set forth in claim 1, wherein said shroud-receiving body portion is cold formed.

15. The method set forth in claim 1, wherein:
said outwardly extending annular shoulder of said shroud comprises an outer overlap surface;
said inwardly deformed stop of said shroud-receiving body portion comprises an inner overlap surface;

said inner overlap surface of said inwardly deformed stop of said shroud-receiving body portion radially overlaps said outer overlap surface of said outwardly extending annular shoulder of said shroud; and said inner overlap surface of said inwardly deformed stop of said shroud-receiving body portion and said outer overlap surface of said outwardly extending annular shoulder of said shroud are in rotational contact such that said shroud will rotate about said central axis relative to said fastener body under an applied external torque prior to said fastener body rotating when said fastener body is engaged with an external structure at a design installation torque.

16. The method set forth in claim 15, wherein:

said outwardly extending annular shoulder of said shroud comprises an inner contact-free surface orientated about said central axis;

said shroud-receiving body portion comprises an inner bore orientated about said central axis and having an axial depth; and said shroud is rotationally supported in said inner bore of said shroud-receiving body portion such that said inner contact-free surface of said outwardly extending annular shoulder of said shroud is free to rotate in said inner bore of said shroud-receiving body portion.

17. The method set forth in claim 16, wherein said inner contact-free surface of said outwardly extending annular shoulder of said shroud comprises a cylindrical surface having an inside diameter.

\* \* \* \* \*